(12) United States Patent
Whittick et al.

(10) Patent No.: US 9,219,778 B2
(45) Date of Patent: *Dec. 22, 2015

(54) RESOURCE UPLOAD

(75) Inventors: Emlyn Whittick, Powys (GB); Martin E. D. Adams, Southampton (GB); Fenghui Jiang, Eastleigh (GB); Jasmin H. Deakin, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 329 days.

This patent is subject to a terminal disclaimer.

(21) Appl. No.: 13/616,332

(22) Filed: Sep. 14, 2012

(65) Prior Publication Data

US 2013/0013745 A1 Jan. 10, 2013

Related U.S. Application Data

(63) Continuation of application No. 13/471,194, filed on May 14, 2012.

(30) Foreign Application Priority Data

May 18, 2011 (EP) ..................................... 11166500

(51) Int. Cl.
*H04L 9/32* (2006.01)
*H04L 29/08* (2006.01)
*H04L 29/06* (2006.01)

(52) U.S. Cl.
CPC ............... *H04L 67/06* (2013.01); *H04L 63/08* (2013.01); *H04L 67/1095* (2013.01); *H04L 67/1097* (2013.01); *H04L 67/2852* (2013.01)

(58) Field of Classification Search
CPC ........................................................ H04L 9/32

USPC .......................................................... 709/219
See application file for complete search history.

(56) References Cited

U.S. PATENT DOCUMENTS 6,260,069 B1 7/2001 Anglin
6,857,020 B1 2/2005 Chaar et al.
(Continued)

OTHER PUBLICATIONS

IBM, "Secure Single Sign-On Among Set of Independent Web Applications", IP.com No. IPCOM000011800D, Mar. 17, 2003, 3 pages.
(Continued)

*Primary Examiner* — David Lazaro
*Assistant Examiner* — Zia Khurshid
(74) *Attorney, Agent, or Firm* — Yee & Associates, P.C.; Parashos Kalaitzis (57) ABSTRACT

A method, system and program for uploading a resource from remote storage to a remote service. The method comprises the steps of connecting to the remote service, initiating an upload of the resource to the remote service, selecting the remote storage as a source of the resource, acquiring the resource from the remote storage, and uploading the resource to the remote service. In one embodiment, at least part of the method is executed by a proxy server and the step of acquiring the resource from the remote storage comprises downloading the resource to the proxy server. In another embodiment, the remote service communicates directly with the remote storage. In this further embodiment, a client device acquires authentication data for the resource from the remote storage and the step of acquiring the resource from the remote storage includes providing the authentication data to the remote storage.

6 Claims, 6 Drawing Sheets

(56) References Cited

U.S. PATENT DOCUMENTS

| | | | |
|---|---|---|---|
| 7,058,696 B1* | 6/2006 | Phillips et al. | 709/217 |
| 7,089,585 B1 | 8/2006 | Dharmarajan | |
| 7,185,192 B1 | 2/2007 | Kahn | |
| 8,196,175 B2 | 6/2012 | Reed et al. | |
| 2004/0010714 A1* | 1/2004 | Stewart | 713/201 |
| 2004/0137978 A1 | 7/2004 | Cole et al. | |
| 2007/0061266 A1 | 3/2007 | Moore et al. | |
| 2008/0028445 A1 | 1/2008 | Dubuc et al. | |
| 2008/0071786 A1 | 3/2008 | Swanburg et al. | |
| 2008/0086735 A1 | 4/2008 | Cheenath et al. | |
| 2008/0126475 A1 | 5/2008 | Morris | |
| 2008/0320131 A1 | 12/2008 | Chalmers et al. | |
| 2009/0025068 A1* | 1/2009 | Benameur et al. | 726/5 |
| 2009/0030705 A1 | 1/2009 | Simpson et al. | |
| 2009/0030923 A1 | 1/2009 | Chalmers et al. | |
| 2010/0042992 A1 | 2/2010 | Vasilevsky et al. | |
| 2010/0050233 A1 | 2/2010 | Ross | |
| 2010/0106933 A1* | 4/2010 | Kamila et al. | 711/171 |
| 2010/0299763 A1 | 11/2010 | Marcus et al. | |
| 2010/0306399 A1* | 12/2010 | Khosravi et al. | 709/231 |
| 2011/0022880 A1* | 1/2011 | Champion et al. | 714/2 |
| 2011/0072493 A1* | 3/2011 | Morishita et al. | 726/3 |
| 2011/0154033 A1* | 6/2011 | Nakagoe et al. | 713/168 |
| 2011/0246294 A1 | 10/2011 | Robb et al. | |
| 2012/0054364 A1 | 3/2012 | Andries et al. | |
| 2012/0159572 A1 | 6/2012 | Patel et al. | |
| 2012/0246114 A1 | 9/2012 | Edmiston et al. | |
| 2012/0297450 A1 | 11/2012 | Whittick et al. | |
| 2013/0122863 A1 | 5/2013 | Chen et al. | |

OTHER PUBLICATIONS

Schiffmann et al., "DAuth: Fine-Grained Authorization Delegation for Distributed Web Application Consumers", Proceedings of the 2010 IEEE International Symposium on Policies for Distributed Systems and Networks, Jul. 2010, 8 pages.

Non-final office action dated Oct. 9, 2013 regarding U.S. Appl. No. 13/471,194, 24 pages.

Ahmad et al., "Considerations for mobile authentication in the Cloud," Information Security Technical Report, vol. 16, Nos. 3-4, Aug.-Nov. 2011, pp. 123-130.

Notice of Allowance, dated Apr. 9, 2014, regarding U.S. Appl. No. 13/471,194, 18 pages.

* cited by examiner

Fig. 6 ved a method of uploading a resource from remote storage to a remote service, the method comprising the steps of connecting to the remote service, initiating the upload of the resource to the remote service, selecting the remote storage as the source of the resource, acquiring the resource from the remote storage, and uploading the resource to the remote service.

RESOURCE UPLOAD

CROSS-REFERENCE TO RELATED APPLICATION(S)

This application is a Continuation of and claims the benefit of priority to U.S. patent application Ser. No. 13/471,194, filed on May 14, 2012 and entitled "Resource Upload", which claims the benefit of priority to European Patent Application No. 11166500.6, filed on May 18, 2011, the contents of which are hereby incorporated by reference.

This invention relates to a method of uploading a resource from remote storage to a remote service.

The expansion of the Internet has lead to the provision of websites and services that support a wide range of functions including the sharing of resources such as photographs. Some services, such as a Flickr™ service (Flickr is a trademark of Yahoo! Inc.), are designed centrally around the storage of a resource (in Flickr's case, photographs) while other services, such as a Facebook™ service (Facebook is a trademark of Facebook Inc.), are predominantly social networking sites that in addition provide facilities to upload and share resources such as photographs through the website. In general, a user must create an account with the particular website or service in order to access the functionality provided by the website or service.

A known problem with these types of services is that sharing resources between different third-party services require either the one-off transferral of the resource only, or alternatively granting access so that one service is able to access the other service's resource repository. For example, a user may wish to share photographs from their Flickr account into their Facebook account. In doing so they may either grant access to a Flickr service from a Facebook service or vice-versa to transfer the photographs, or they can download the photographs manually from a Flickr service and then manually upload them to a Facebook service.

The first solution mentioned is to grant access to the third-party service to allow access to the resource repository. This would be achieved either by setting up a server-to-server access control for permanent access (for example as provided by Facebook's offline access API), or providing the master login credentials. Many modern mobile applications utilize such an authentication method. The second solution is for the user to download and upload the resources manually.

The drawbacks to the first solution include a lack of control over what resources in the repository can be accessed by the third-party service, an inability to specify a time of expiry for a service to access a repository, the placing of trust on services that wish to access the file repository, which increases the risk when new and unfamiliar services are granted access, a reduction in user confidence if too much access must be granted to services and an increased risk because services will store user credentials and therefore making it prone to hacking or misuse.

The drawbacks to the second solution include the fact that it is a manually cumbersome process and may be very slow on low-bandwidth connections, for example if the client device is a mobile device, the transfer must be initiated at that time and cannot be scheduled for a different time, and during the transfer, the client device is essentially locked to communicating with the server and for very large files and small client devices, having to transfer the file to the device will use up valuable system resources on the client device.

It is therefore an object of the invention to improve upon the known art.

According to a first aspect of the present invention, there is provided a method of uploading a resource from remote storage to a remote service, the method comprising the steps of connecting to the remote service, initiating the upload of the resource to the remote service, selecting the remote storage as the source of the resource, acquiring the resource from the remote storage, and uploading the resource to the remote service.

According to a second aspect of the present invention, there is provided a system for uploading a resource from remote storage to a remote service, the system comprising a client device, the remote service and the remote storage, wherein components of the system are arranged to connect to the remote service, initiate the upload of the resource to the remote service, select the remote storage as the source of the resource, acquire the resource from the remote storage, and upload the resource to the remote service.

Owing to the invention, it is possible to simplify resource access control without needing to provide blanket authorization to a resource repository. The improved method and system allows a client device to communicate with cloud storage to provide like-for-like functionality when selecting files, while configuring resource transfer and authorization mechanisms transparently to the user. The user is able to achieve the transfer of resources (such as files for photographs and documents) between different services in a simple manner without the drawbacks of having to grant open access of one service to another service. A computer program stored on a computer readable medium and loadable into the internal memory of a digital computer, comprising software code portions, when said program is run on a computer, can be provided for performing the method.

The invention has a number of benefits with respect to user privacy. The user only grants access to the specific resources, rather than blanket access to the remote repository. The client system (for example a browser) can communicate with a server without having to pass the authentication credentials to the service as authorization is controlled in the storage repository. The user can alter the access to a resource at any time, such as cancelling permission to retrieve it, or allow it to expire after a time limit or number of downloads. The repository can enforce secure encrypted transfer of the resources to the service, rather than the client relying on HTTPS supplied by the service when performing a traditional HTTP POST. The client browser can associate the user's cloud storage account based on the host operating system user. This means that in a multiple desktop user environment, other users can't access the repository files.

In embodiments using a proxy server for legacy applications, the resource can be injected into the in-flight HTTP POST meaning the bandwidth can be saved on the client, but full access to the repository is still not required on the service. The repository could be used as a durable subscription to one or more resources which the end user can revoke access in the repository making it consistent and easier to use. Auditing of the files can be monitored to identify which services have requested the resources, and when they were requested. For asynchronous retrieval of a resource, it could be configured to only become active after a period of time. An example of this usage would be a news agency syndicating a new article, but allowing access only after a specific time if there is an embargo in place. The service can retrieve the file asynchronously. It allows the news agency to submit the article during a quiet time in advance and synchronize access to all syndicates at once.

In the interest of privacy of data retention, the resource could be tagged for a recommended retention period, for example, photos submitted to a Facebook system should be removed after three months. When the file is retrieved asynchronously, a deletion policy can be linked to the resource which is defined by the user at the point of the initial authorization. Services that implement the cloud storage service could provide a backtrack URL to the resource, so the user can revoke permission to a resource, the repository will contact all backtrack URLs and request remote deletion. This would deliver a simple method for managing the removal of resources such as photographs, videos and documents etc. on social networking sites for example.

In a preferred embodiment, the system works primarily by overriding a web browser file selection dialog box to allow resources from remote storage to be selected. The client device displays a list of local storage devices that also includes the remote storage, and receives a defined user input selecting the remote storage. Based on the mode of transfer to the service, the dialog box can decide to authorize the host for that resource, embed a reference to the resource for a proxy server to retrieve or to transfer the resource locally for posting to the server.

There are three possible modes in which the system could work. The first mode is the ideal scenario which provides maximum benefits. It relies on having cloud-aware services. The second and third scenarios are provided to cover current legacy services. All three assume that the client device has a browser extension which is covered in the implementation. The possible modes and their corresponding advantages are summarized below.

In the first implementation, cloud-aware services are utilized whereby the client can control which resources can be accessed by which services without needing to pass user credentials between them. The advantages of this implementation are that the user's client such as a browser can integrate with the cloud and set up a "one-time only" or time-limited access automatically. This results in the user not having to take additional steps. The transfer can be scheduled at a later date as it is a server-to-server communication, thus enabling the client to disconnect or carry on with other tasks. The transfer is executed server-to-server reducing the cost and bandwidth needs for the client. The user does not need to trust the service as the cloud storage will control all authorization. The user may revoke authorization to an individual resource at any time or to the service entirely.

In the second implementation, a legacy service can use a proxy server to interact with cloud storage. The service does not need to be cloud storage aware. The client device only needs to send metadata of the resource to be transferred, resulting in low-bandwidth requirements. This implementation has all the benefits of the first implementation above, except that any sensitive information to the service will now be visible to the proxy server. The client will be connecting to a proxy address and this could result in some legacy application incompatibility.

In the third implementation, a legacy service will use a web client to interact with cloud storage, authenticating once with the cloud storage and then fetch the resource. This solution provides the maximum compatibility as it does not require a proxy server or any additional capabilities of the service. In this implementation there is drawback in that the client will transfer the cloud resource through the client itself resulting in no saving on bandwidth.

Embodiments of the present invention will now be described, by way of example only, with reference to the accompanying drawings, in which:—

Figure 1:
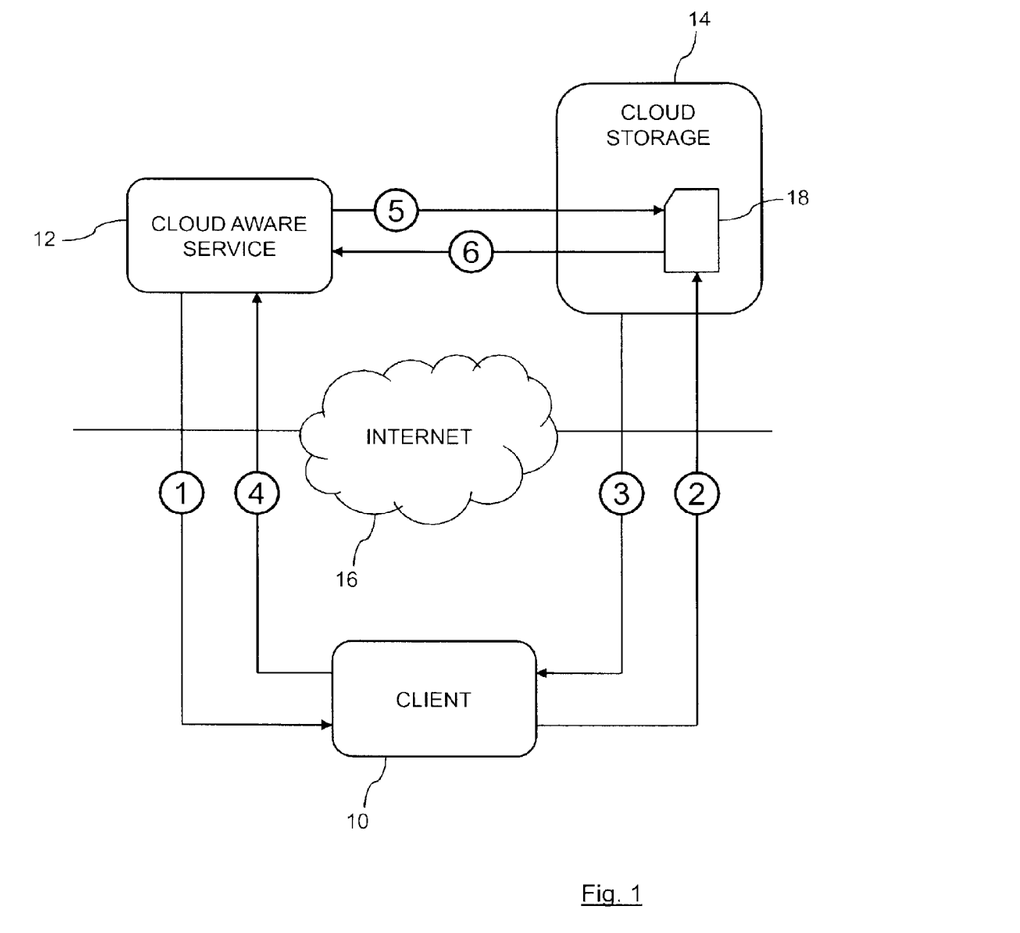
FIG. 1 is a schematic diagram of a first implementation of a client, service and storage system.

FIG. 1 illustrates a client device 10 connecting to a remote service 12 and, separately, a remote storage 14, both via a network 16. The client device 10 could be a conventional desktop computer or a mobile device which is connecting to one or more remote services via the Internet using a browser being run by the client device 10. In the context of the system being described, the use of the word "cloud" refers to a method of delivering a capability that is both distributed amongst multiple machines and is essentially universally accessible. Therefore the cloud storage 14 provides a storage functionality that is distributed amongst many different servers and can be accessed from anywhere with a suitable terminal device that has an Internet connection.

The system shown in FIG. 1 is concerned with the uploading of the resource 18 to the cloud-aware service 12. The resource 18 could be a file such as a photograph which is being stored on a Flickr system (the cloud storage 14) and is to be uploaded to a web service such a Facebook system (the cloud-aware service 12). The implementation shown in FIG. 1 is based on the assumption that the service 12 is cloud-aware in the sense that it can interact directly with the cloud storage 14 according to the system described below, particularly with reference to FIG. 2. The system works primarily by overriding a web browser file selection dialog box to allow resources 18 from the cloud storage 14 to be selected.

When the client browser requests a web page from a cloud-aware service 12, the service 12 can respond with a new HTTP response header to indicate the cloud authentication code that it will use when requesting the cloud resource. For example:

Date: Mon, 23 May 2005 22:38:34 GMT
Server: Apache/1.3.3.7 (Unix) (Red-Hat/Linux)
Last-Modified: Wed, 8 Jan. 2003 23:11:55 GMT
Etag: "3f80f-1b6-3e1cb03b"
Accept-Ranges: bytes
Content-Length: 438
Connection: close
Content-Type: text/html; charset=UTF-8
X-Cloud-Auth: abcdefg1234567890

The presence of the X-Cloud-Auth response header indicates to the client 10 that it supports a server-to-server file transfer. The value of the header is an authorization code that the client 10 will pass to the cloud storage 14 so the cloud storage 14 can authenticate the service 12 when the service 12 requests the resource 18. When the client 10 sends a HTTP POST back to the service 12 with one or more embedded cloud resources 18, the message contents will appear as follows:

POST/Service/Upload HTTP/1.0
User-Agent: HTTPBrowserAgent/1.0
Content-Type: application/x-www-form-urlencoded
Content-Length: 32
X-Cloud-Fields: image1,image2,image3
name=Photo+Collection&image1=http://example.com/ cloud/user/image1.jpg&image2=http://exa mple.com/cloud/user/image2.jpg&image3=http://example.com/cloud/user/image3.jpg It is possible to use existing methods of transferring the post data, such as URL encoded or MIME encoded. The cloud-aware service 12 will look for the X-Cloud-Fields request header in the post and can identify which fields in the message body will contain a fully qualified URL to the cloud resource 18. The service 12 will then request that URL, either passing its authentication code in the HTTP header immediately, or at a later time.

Figure 2:
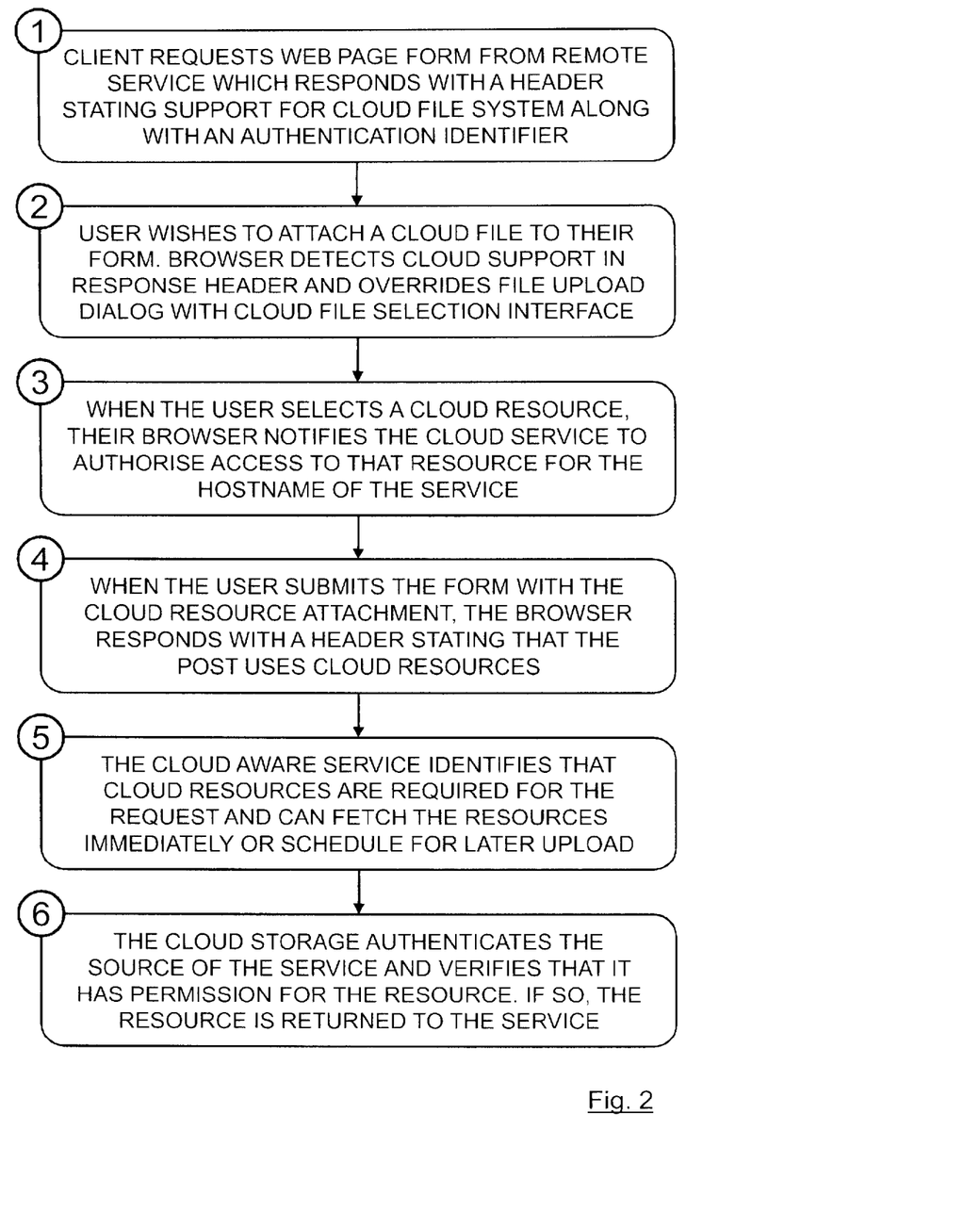
FIG. 2 is flowchart of a method of operating the system of FIG. 1.

FIG. 2 illustrates the steps taken in the operation of the system implementation of FIG. 1. The numbering of the steps in FIG. 2 corresponds to the numbers in circles in FIG. 1. At step 1, the client device 10 requests a web page from the remote service 12. The remote service 12 responds with a header indicating that the service 12 is cloud-aware. At step 2, the user operates the browser on the client device 10 to indicate that they wish to upload the resource 18 from the cloud storage 14. When the user selects "upload" in the browser, they are given the option of accessing the remote storage 14 as an additional drive in the file explorer.

Once the user selects the resource 18 that is stored by the cloud storage 14, then at step 3, the browser notifies the cloud service 14 to provide an authorization for the specific resource 18 for the specific service 12. At step 4, when the user submits their upload request to the service 12, the authorization received from the cloud storage 14 is passed to the service 12 indicating that cloud storage 14 is the source of the resource 18 to be uploaded. In this way, the modified browser is controlling the access to the cloud storage 14 on behalf of the user, without the need for the service 12 to have permanent access to the remote storage 14.

At step 5, the cloud-aware service 12 identifies that a resource 18 stored by the cloud storage 14 is required for the upload that is being instructed by the user of the browser run by the client device 10. The cloud-aware service 12 has the option to fetch the resource 18 immediately or can schedule the obtaining of the resource for a later time, depending upon the current loads on the service 12. At step 6, the cloud storage authenticates the source of the service 12 making the request for the resource 18 and if permission has been given for the specific service 12 and the specific resource 18, then a copy of the resource 18 is provided to the service 12.

Figure 3:
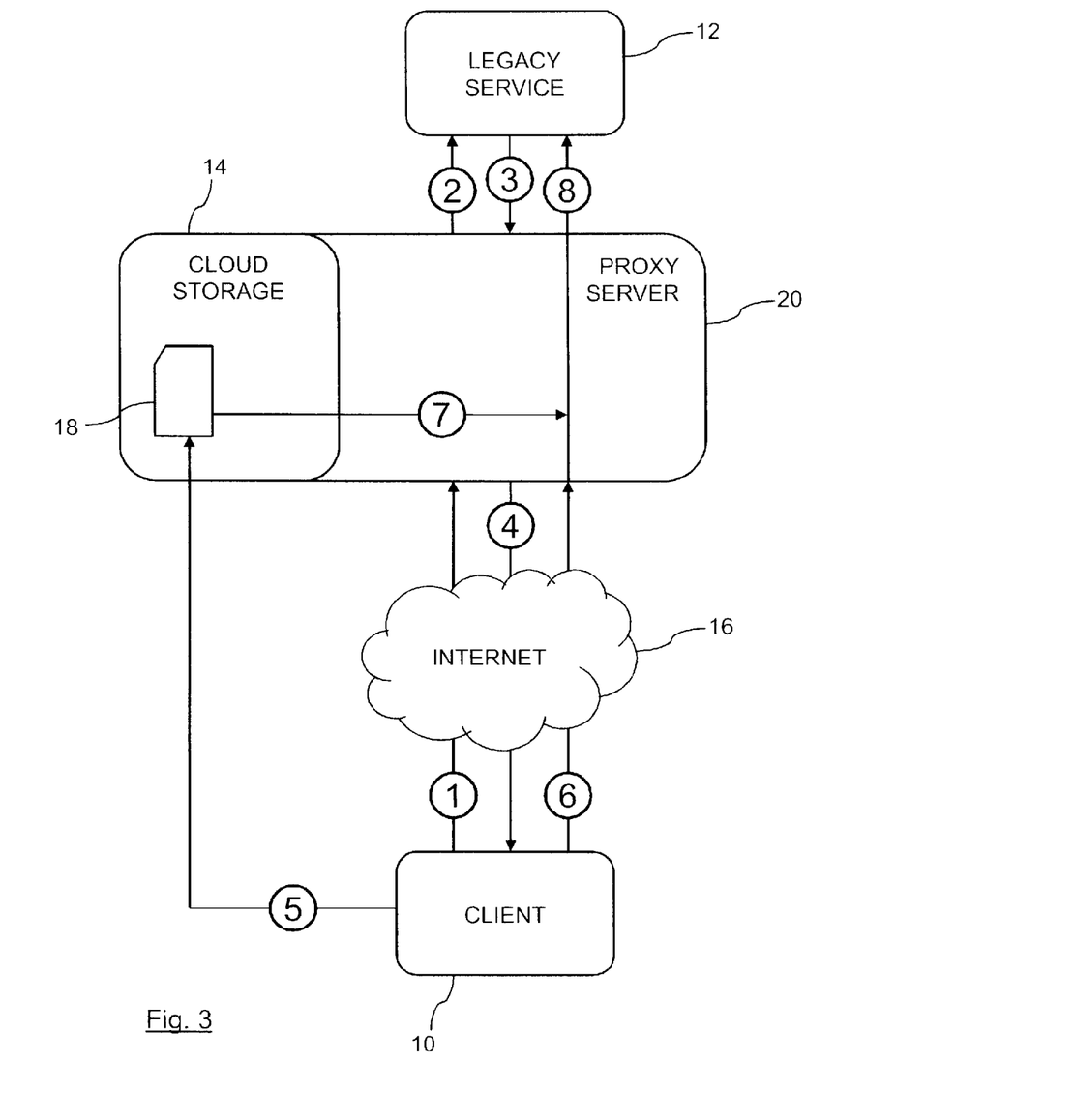
FIG. 3 is a schematic diagram of a second implementation of the client, service and storage system.

FIG. 3 illustrates how a client device 10 can use a legacy non-cloud-aware service 12 but receive the benefits of not needing to transfer the entire file resource 18 on the client's bandwidth. When a client device 10 communicates via a proxy server 20, the user configures their client device 10 running a browser to use the proxy server 20 associated with the cloud storage 14. The proxy server 20 can use the same HTTP headers as the cloud-aware service 12, described above with reference to FIGS. 1 and 2. The only difference is that the proxy server 20 will inject the file contents in the in-flight HTTP POST.

The client device 10 communicates with the proxy server 20, which is associated with the remote storage 14. This implementation allows an existing and non-cloud-aware service 12 to be accessed and used while still delivering the improvements of being able to access storage 14 that is cloud-based, without having to either manually download and upload the resource 18 or having to give the legacy service 12 permanent access to the user's account details on the cloud storage 14. The browser being run by the client device 10 again will provide a modified upload function that will give the user the option to select the cloud storage 14 when they wish to upload a resource 18 to the remote legacy service 12.

The client device 10 communicates with the proxy server 20 which has the intelligence to essentially intercept the communications to and from the legacy service 12, while also communicating with the cloud-based storage 14. This process is transparent to the legacy service 12, which will assume that a resource 18 is being uploaded from the client device 10, without realizing that the proxy server 20 is obtaining the resource 18 from the cloud storage 14 and performing the uploading to the service 12. The proxy server 20 is shown as associated with the cloud storage 14, but could be an independent service provided with one-time access to the cloud storage 14 to retrieve the desired resource 18.

Figure 4:
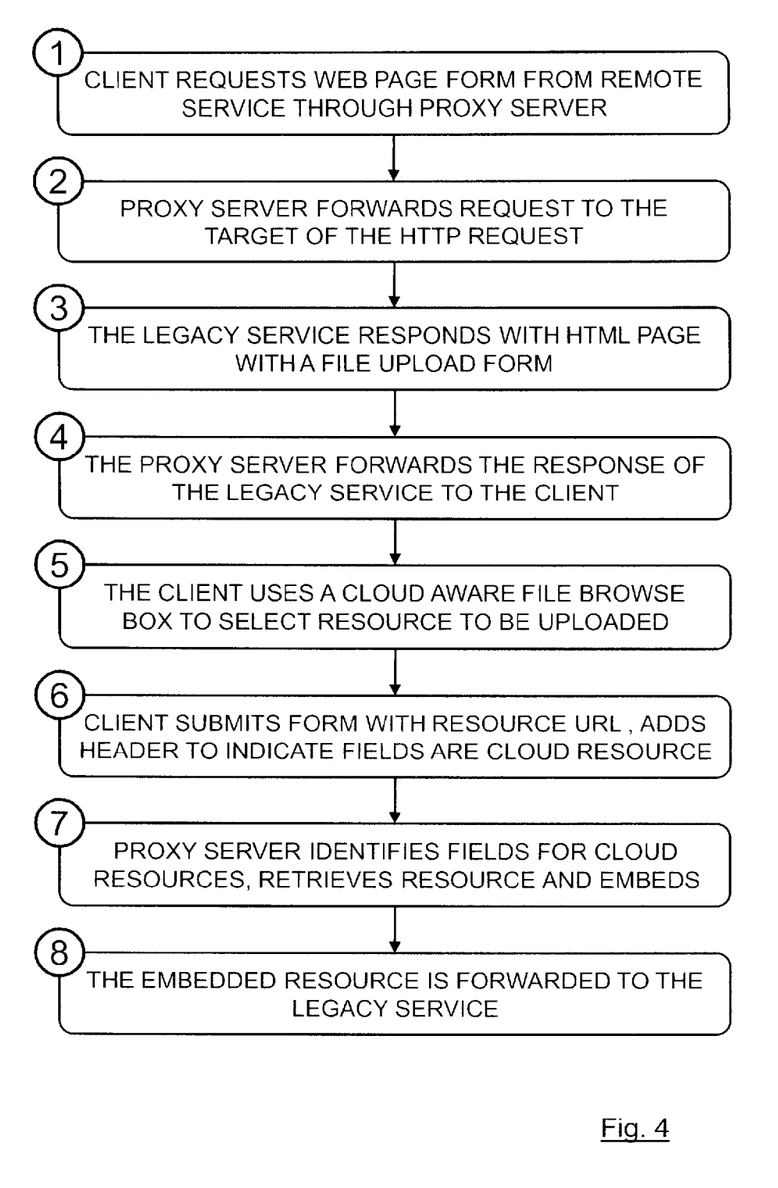
FIG. 4 is flowchart of a method of operating the system of FIG. 3.

FIG. 4 illustrates the steps taken in the operation of the second implementation of the system, shown in FIG. 3. The numbering of the steps in FIG. 4 corresponds to the numbers in circles in FIG. 3. At step 1, the client device 10 requests a web page from the remote service 12, through a proxy server 20. The server 20 is hosted within the cloud system that also includes the cloud storage 14. At step 2, the proxy server 20 forwards the request to the target host of the original HTTP request from the client device 10. The legacy service 12 does not know that there is a client device 10 behind the proxy server 20.

At step 3, the legacy service 12 responds to the received request with a normal HTML page which includes a file upload form. At step 4, the proxy server 20 forwards the received response of the legacy service 12 to the client device 10. The client device 10 is operating a modified browser, as discussed above, with respect to the first implementation. At step 5, the cloud-aware browser provides the user with the option to select a resource 18 that is located at the cloud storage 14. The user is able to navigate a suitable graphical user interface to choose the cloud storage as an option when uploading a file through the browser.

At step 6, the client device 10 submits the form which has embedded within it a resource URL in the file contents MIME message for the resource 18 being uploaded. A header is added to the HTTP post request to indicate which fields in the message refer to cloud resources 18. At step 7, the proxy server 20 identifies which fields in the post require the cloud resource 18 to be inserted into the message body before it is forwarded to the remote service 12. The proxy server 20 retrieves the correct resource 18 from the storage 14 and embeds the resource in the message. At step 8, the proxy server 20 forwards the message to the remote legacy service 12.

Figure 5:
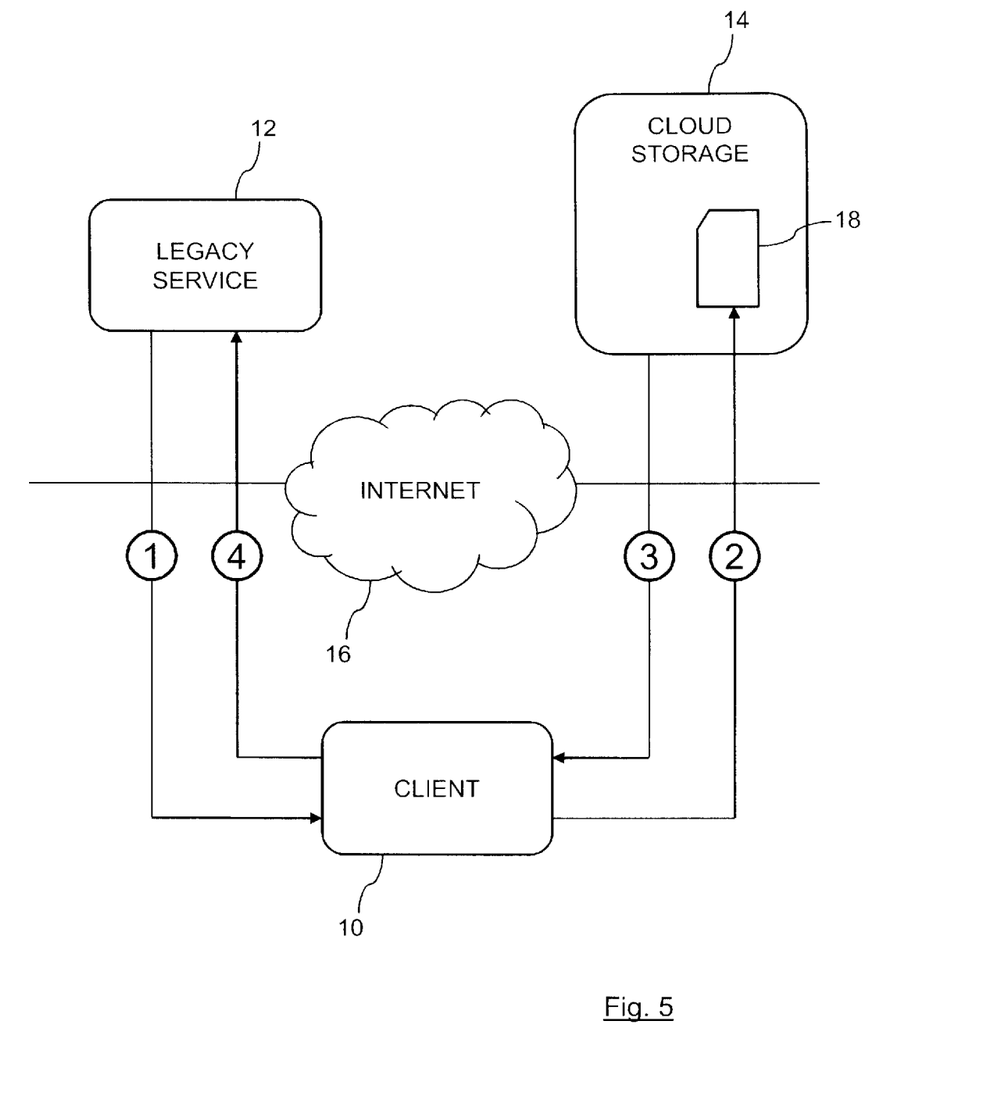
FIG. 5 is a schematic diagram of a third implementation of the client, service and storage system.

FIG. 5 illustrates a legacy service that is operated without using a cloud-aware proxy server 20. In this scenario, there are no modifications to the editing HTTP messages when communicating with the legacy service 12. The resource 18 stored by the cloud storage 14 will be transferred through the client device 10. In this scenario, it is possible for the client to cache the resources 18 to reduce the bandwidth required to perform step 3, described in more detail below with reference to FIG. 6. The implementation shown in FIG. 5 is essentially the simplest embodiment that will work with both legacy services 12 and with legacy cloud storage systems 14.

All of the modifications present in FIG. 5 are delivered by features of the browser being run by the client device 10. The client browser can control the client account information to the cloud storage 14. This means that any time a local file could be referenced by the browser, such as in the presence of a <input type="file"> HTML tag, the file selection dialog box can be overwritten with a local and cloud storage version. Essentially the user is given the option of an additional storage device when selecting a resource 18 to upload. For example, this may be shown to the user in the graphical user interface of the browser as an "R" drive (R meaning remote).

Any selections of a cloud storage version of a resource 18 will transfer the resource 18 based on one of the different scenarios described above. The principal of all three implementations are the same, which is that the user can select the cloud storage 14 as the source of the resource 18 to be uploaded, and this is mediated transparently to the user without the service 12 being given permanent access to the cloud storage 14. This provides numerous advantages, mainly simplifying the process for the user without tying up resources on their client device 10 or the connection to the client device 10, while maintaining their privacy between different online services.

Figure 6:
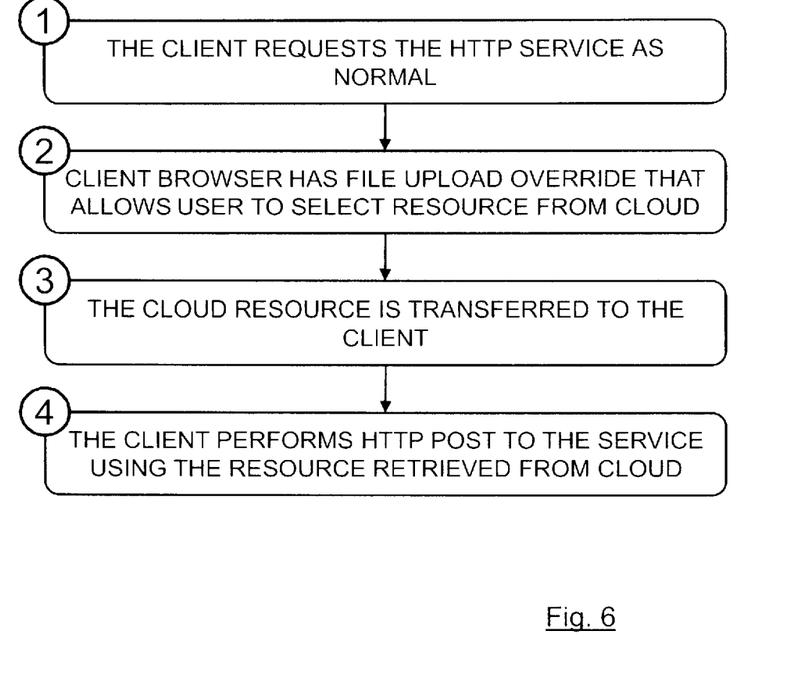
FIG. 6 is flowchart of a method of operating the system of FIG. 5.

FIG. 6 illustrates the steps taken in the operation of the second implementation of the system, shown in FIG. 5. The numbering of the steps in FIG. 6 corresponds to the numbers in circles in FIG. 5. At step 1, the client device 10 requests an HTTP service 12 as normal. At step 2, the client browser provides the resource upload functionality discussed above, which allows the user to select a resource 18 stored on remote cloud storage 14. At step 3, the cloud resource 18 is transferred to the client device 10. At step 4, the client device performs a HTTP post to the remote service 12 using the resource 18 retrieved from the cloud storage 14.

It is also possible for the user to control various different attributes of the resources 18. This can be used to allow access to multiple resources 18 (for cloud-aware services 12 only). The cloud storage server 14 can provide a list of file URLs or generate a new URL that represents the set of resources 18. The cloud-aware service 12 would need to request multiple files. Similarly, it is possible to allow access to a folder, again for cloud-aware services 12 only. The cloud-aware service 12 would need to know to request multiple files. It is also possible to create a more durable subscription. The cloud-aware service 12 could request access to the resource 18 multiple times, for example, to retrieve the latest version.

Other types of access may be preferred. This could be the creation of a one-time only access. The permission to access the resource 18 is removed after the resource 18 has been accessed once. Alternatively, or in addition, there could be created a time limited access, where permission to access the resource 18 is removed after a specific time period has elapsed. Another alternative is to create a limited number of accesses. The permission to access the resource 18 is removed after a specified number of requests have been satisfied. The user can modify any permission settings to a resource 18 to force the expiry of access to a remote service.

While this system covers the transfer of a cloud storage resource 18 direct to a remote service 12, the system could also be used to submit a URL where the cloud service 14 could post the resource 18. This could be designed for services that allow users to transfer large files to their own cloud storage, such as for video conversions.

The cloud-aware service 12 could also set up a subscription to the resource 18 and have a reverse connection to be notified if the file changes. An example of this use would be where a person's CV is posted to multiple job agency sites. If that user updates their CV on the cloud storage 14, it could automatically notify all the job agencies where they can request to update their local copy.

The system can use existing proven technologies such as SSL to ensure that communication between the servers 12 and 14 is secure. One important aspect however is that it is not possible for JavaScript to programmatically interact with the values of the resource 18. This would prevent an attack where a malicious JavaScript program attempts to trick the client browser 10 into transferring cloud resources 18 to the server 12 without explicit user permission.

The invention claimed is:

1. A method of uploading a resource from remote storage to a remote service, the method comprising the steps of:
   connecting to the remote service;
   determining, by a client device, whether an HTTP response header received from the remote service includes a cloud authentication code indicating that the remote service supports a server-to-server file transfer to the remote storage;
   initiating, by the client device, an upload of the resource to the remote service;
   selecting, by the client device, the remote storage as a source of the resource responsive to determining that the HTTP response header received from the remote service includes the cloud authentication code;
   acquiring, by the client device, an authorization from the remote storage for access to the resource; and
   uploading, by the client device, the authorization received from the remote storage to the remote service, wherein the remote service is able to access the resource from the remote storage using the authorization.

2. A method according to claim 1, wherein the connecting step is executed by a client device and wherein the resource is acquired by the remote service from the remote storage without the client device being authenticated with the remote service.

3. A method according to claim 1, wherein the initiating step is performed by a client device that provides, to the remote service, resource location information of where the resource is located.

4. A method according to claim 1, wherein the authentication data for the resource also includes data identifying the remote service.

5. A method according to claim 1, further comprising responsive to detecting that the remote service supports server-to-server file transfer for accessing the remote storage by the remote service, displaying a list of local storage devices and the remote storage, and receiving a defined user input selecting the remote storage.

6. A method according to claim 1, wherein the authentication data is specific to the resource and is presented to the remote storage by the remote service.

* * * * *